United States Patent [19]

Matthews

[11] Patent Number: 5,230,712
[45] Date of Patent: Jul. 27, 1993

[54] METHOD FOR PRODUCING MULTI-CELL SOLID STATE ELECTROCHEMICAL CAPACITORS AND ARTICLES FORMED THEREBY

[76] Inventor: M. Dean Matthews, P.O. Box 24, Saratoga, Calif. 94071

[21] Appl. No.: 952,347

[22] Filed: Sep. 28, 1992

[51] Int. Cl.⁵ .................. H04R 17/00; H01G 9/00; H01G 5/38; B05D 5/12
[52] U.S. Cl. .................. 29/25.03; 361/523; 361/541; 427/79
[58] Field of Search .............. 29/25.03; 427/79; 361/434, 523, 527, 529, 532

[56] References Cited

U.S. PATENT DOCUMENTS

| | | | |
|---|---|---|---|
| 3,419,760 | 12/1968 | Raleigh | 317/230 |
| 3,562,008 | 2/1971 | Martinsons | 117/221 |
| 3,632,498 | 1/1972 | Beer | 204/290 |
| 3,718,551 | 2/1973 | Martinsons | 204/98 |
| 3,776,834 | 12/1973 | O'Leary | 204/290 |
| 4,052,271 | 10/1977 | Beer | 204/38 |
| 4,414,607 | 11/1983 | Sekido et al. | 29/25.03 |
| 4,925,538 | 5/1990 | Matsumoto et al. | 204/129 |
| 5,047,899 | 9/1991 | Bruder | 361/502 |
| 5,055,169 | 10/1991 | Hock, Jr. et al. | 204/192 |
| 5,062,025 | 10/1991 | Verhoeven et al. | 29/25.03 |
| 5,136,478 | 8/1992 | Bruder et al. | 29/25.03 |

FOREIGN PATENT DOCUMENTS 1196683  11/1985  Canada ................ 319/73

OTHER PUBLICATIONS

Dislich, Helmut, J. Non-Crystalline Solids 57 (1983), pp. 371–388.
"Operating Principles of the Ultracapacitor", G. L. Bullard, et al., IEEE Transactions on Magnetics, vol. 25, No. 1, Jan. 1989 pp. 102–106.
"Thin Layers of Ceramics From Sol-Gel Process (or Inorganic Membranes) for Liquid Separations", A. Larbot, et al, High Tech Ceramics, edited by P. Vincenzini, Elsevier Science Publishers, B.V., Amsterdam, 1989, pp. 2259–2263.
"Advanced Double Layer Capacitors", S. Sarangapani, et al., Journal of Power Sources, 29 (1990) pp. 355–364.
"Electrochemical Lithium Intercalation in Na0.33 V2 O5 Bronze Prepared by Sol-Gel Processes", J. P. Pereira-Ramos, et al. Solid State Ionics 28 (1988) pp. 886–894.
"Birnessite Manganese Dioxide Synthesized via a Sol--Gel Process: A New Rechargeable Cathodic Material for Lithium Batteries", S. Bach et al, Electrochemica Acta, vol. 36, No. 10 (1991) pp. 1595–1603.

(List continued on next page.)

Primary Examiner—Olik Chaudhuri
Assistant Examiner—Ramamohan R. Paladugu
Attorney, Agent, or Firm—Steven M. Mitchell; Mark J. Meltzer

[57] ABSTRACT

A method for making an electrochemical capacitor is disclosed. A plurality of bipolar electrodes having porous conductive oxide coatings on opposite sides of a thin metal foil are first produced in a fixture assembly using sol-gel processing techniques. A dielectric oxide coating is then applied to one or both conductive coatings using the sol-gel process. A stack of a plurality of the bipolar electrodes with adjacent electrodes separated by a predetermined amount of a solid electrolyte is assembled. The stacked assembly is heated to a temperature above the electrolyte melting point allowing the molten electrolyte to infiltrate the porous coatings. Pressure is applied to the stacked assembly sufficient to produce intimate contact between adjacent surfaces of the bipolar electrodes while expelling excess liquid from between the electrode surfaces. The stacked assembly is cooled in a controlled fashion to produce a laminate structure. This laminate structure may be cut by a diamond saw along the edges and packaged to produce an electrochemical capacitor having the desired capacitance.

23 Claims, 3 Drawing Sheets

OTHER PUBLICATIONS

"A Sol-Gel Route to Composite Positive Electrodes for Lithium Cells with Polymer Electrolytes", M. Minett et al, Journal of Power Sources, 28 (1989) pp. 397-408.

"Multi Component Glasses from the Sol-Gel Process" I. Thomas, Sol-Gel Technology for Thin Films, Fibers, Preforms, Electronics and Specialty Shapes, edited by Lisa Klein, Noyes Publications, 1988, pp. 2-9.

"Thin Films from the Sol-Gel Process", H. Dislich, Sol-Gel Technology for Thin Films, Fibers, Preforms, Electronics and Specialty Shapes, edited by Lisa Klein, Noyes Publications, 1988, pp. 50-73.

"Electronic Ceramics made by the Sol-Gel Process", J. Blum, Sol-Gel Technology for Thin Films, Fibers, Preforms, Electronics and Specialty Shapes, edited by Lisa Klein, Noyes Publications, 1988, pp. 296-302.

"Transition from 'Supercapacitor' to 'Battery' Behavior in Electrochemical Energy Storage", B. Conway J. Electrochem. Soc., vol. 138, No. 6, Jun. 1991, pp. 1539-1548.

METHOD FOR PRODUCING MULTI-CELL SOLID STATE ELECTROCHEMICAL CAPACITORS AND ARTICLES FORMED THEREBY

TECHNICAL FIELD

The present invention relates generally to the production of devices used for the storage of electrical energy, and more specifically to a process for producing multi-cell solid state electrochemical capacitors and the capacitors produced using such method.

BACKGROUND OF THE INVENTION

Devices for the storage of electrical energy can be described as batteries or capacitors based upon the mechanisms used for energy storage and the discharge characteristics they exhibit. For example, see B. E. Conway, J. Electrochem. Soc., v138, n6, pp. 1539-48, 1991. In rechargeable batteries, energy is stored almost entirely through reversible oxidation-reduction (redox) reactions. Although a double layer exists at the electrode surfaces, it contributes very little to the stored energy. In capacitors, a significant amount of energy is stored in the double layer at the electrode surfaces although in some cases, as described by Conway above, a major fraction of stored energy is attributable to reversible surface redox reactions.

As compared to batteries, electrochemical capacitors can be characterized as having low energy density, high power density and a high cycle life as described in S. Sarangapani et. al., Journal of Power Sources, v29, pp. 355-64, 1990. Further, in an electric circuit, an electrochemical capacitor behaves more like a classical dielectric capacitor than a battery, hence its name.

The fundamental unit or cell of an electrochemical capacitor consists of two electrodes and an electrolyte. Both double layer and redox reactions may occur at one or both electrode surfaces. The energy storage of the device is limited by the decomposition voltage of the electrolyte and the available electrode surface area. The decomposition voltage is the voltage at which non-reversible redox reactions occur between the electrode surface and the electrolyte. For example, capacitors utilizing an aqueous electrolyte are limited to the potential at which water electrolyzes (about 1.2 volts). A capacitor employing a solid electrolyte such as RbAg$_4$I$_5$ is limited to a cell voltage of less than 0.7 volts.

The conventional method for making solid electrolyte capacitors is based upon the use of powdered materials for the electrolyte that are pressed or held together with a binder. U.S. Pat. Nos. 3,419,760 and 5,047,899 exemplify the pressed powder method for solid electrolyte capacitors.

One way to increase the voltage of electrochemical cells is to stack a number of cells together in series, similar to a multi-cell battery. However, multi-cell electrochemical capacitors have been limited in voltage due to the difficulty of manufacturing devices containing a large numbers of cells with sufficiently low equivalent series resistance. These devices have also been limited in application due to their relatively high cost of production. Another problem in producing electrochemical capacitors is that virtually all of the prior art methods for assembling a multi-cell capacitor involve stacking or aligning a series of individual electrodes and subsequently packaging the assembled electrodes as a single capacitor. This method of assembly requires the handling of a large number of elements with close tolerances for each device. For devices with electrodes and standoffs with small dimensions, the alignment becomes very important with respect to short circuits between cells in a device. In the case of solid electrolyte devices, multi-cell stacks are seldom used due to the difficulty of working with powders. Also, the minimum electrode thickness that can be achieved limits the number of cells that can be assembled in a practical device.

As stated above, the energy density of electrochemical capacitors is inferior to that of batteries. This is in part due to the volume of the electrode and electrolyte that does not participate in the storage of energy. Since energy storage occurs at the interfacial surface, the interior volume of the electrode and electrolyte layers is essentially wasted. In addition, the interior volume of the electrode and electrolyte layers contributes to equivalent series resistance of the device, with the bulk being due to the electrolyte. Prior art methods which utilize powders have not been effective in minimizing the interior volume of the electrolyte between the two electrodes. Thus, high conductivity electrolytes such as sulfuric acid are used in spite of the difficulties associated with the containment of a corrosive liquid. The use of solid electrolytes offers the advantage of a more stable and more reliable device at the expense of greater electrolyte resistivity and a typically lower decomposition voltage than aqueous electrolytes such as sulfuric acid. However, the prior art has not effectively reduced the electrolyte thickness. Decreasing the thickness of the solid electrolyte layer would decrease the resistance of the layer and compensate for the higher resistivity of the solid electrolyte. A decreased electrolyte thickness would also permit more cells to be stacked in a device of a given height, thereby compensating for the relatively low decomposition voltage of the solid electrolyte.

Accordingly, it is an object of the invention to provide a method for making a bipolar electrode suitable for use in an electrochemical capacitor. It is another object of the invention to provide an improved method of manufacturing electrochemical capacitors having a thinner solid electrolyte layer. It is a further object of the invention to provide a method of producing multiple cell electrochemical capacitors with a high energy density, high working voltage and a low equivalent series resistance.

SUMMARY OF THE INVENTION

These and other objects are achieved in the present invention by maximizing the available interfacial surface area for energy storage, minimizing the internal volume of the electrode and electrolyte materials and using an infiltrated solid electrolyte in conjunction with a method for assembly that eliminates the need for close tolerance alignment of electrodes.

In accordance with the present invention, a method for making a bipolar electrode suitable for use in an electrochemical energy storage device is provided. A flat metal foil is punched with a pattern of holes arranged so as to enclose at least one electrode surface site. The flat metal foil is arranged between a flat reservoir plate having at least one cutout to allow exposure of a defined area on one side of the flat metal foil, and a vacuum chuck also having a hole pattern identical to that of said metal foil. The vacuum chuck is connected to a vacuum source in order to retain the metal foil against the vacuum chuck. Intimate contact is established between the metal foil and the reservoir plate by a clamping means acting upon the surface of the reservoir plate and the vacuum chuck, thereby forming an electrode fixture assembly with a pocket on one side of the metal foil wherein the pocket is capable of confining a liquid deposited on the surface of the metal foil to the exposed area of the metal foil. The electrode fixture assembly is oriented in a horizontal position and a coating solution containing at least one hydrolyzable compound of a metal capable of forming an electronically conductive oxide, and sufficient water to ultimately hydrolyze the hydrolyzable compound is introduced into the pocket of the electrode fixture assembly. The electrode fixture assembly is placed in a controlled atmosphere and subjected to a time and temperature treatment sufficient to produce a gel coating on the surface of the metal foil. The electrode fixture assembly is subsequently subjected to a time and temperature treatment in a controlled atmosphere sufficient to produce an electrode by converting the gel coating to a dry, porous, adherent and electronically conductive coating.

In an alternate embodiment of the invention another method for making an electrode suitable for use in an electrochemical energy storage device is provided. A flat metal foil having first and second surfaces is positioned between first and second flat reservoir plates, respectively, each of the reservoir plates having at least one cutout to allow exposure of a defined area on each side of the flat metal foil. The reservoir plates are clamped together to establish intimate contact between the metal foil and the reservoir plates, thereby forming an electrode fixture assembly with first and second pockets on opposing sides of the metal foil. Each pocket is capable of confining a liquid deposited on the surface of the metal foil to the exposed area of the metal foil. The electrode fixture assembly is oriented in a horizontal position with the first foil surface, first reservoir plate and first pocket on an upper side of the fixture assembly. A coating solution is introduced into the first pocket. The solution contains at least one hydrolyzable compound of a metal capable of forming an electronically conductive oxide and sufficient water to ultimately hydrolyze the hydrolyzable compound. The electrode fixture assembly is placed in a controlled atmosphere for a time and at a temperature sufficient to produce a gel coating on the first surface of the metal foil. The electrode fixture assembly is removed from the controlled atmosphere and is inverted. A second coating solution is introduced into the second pocket of the electrode fixture assembly. The second solution contains at least one hydrolyzable compound of a metal capable of forming an electronically conductive oxide, and sufficient water to ultimately hydrolyze the hydrolyzable compound. The electrode fixture assembly is then placed in a controlled atmosphere for a time and at a temperature sufficient to produce a gel coating on the second surface of the metal foil. The electrode fixture assembly is then subjected to sufficient time and temperature in a controlled atmosphere to produce a bipolar electrode by converting the gel coatings to first and second dry, porous, adherent and electronically conductive coatings.

In a further embodiment of the method of the invention, a standoff layer is applied to one or both of the bipolar electrodes by the additional steps of orienting the electrode fixture assembly in a horizontal position and introducing into the upper pocket of the electrode fixture assembly a coating solution containing a hydrolyzable compound capable of forming a dielectric oxide, and sufficient water to ultimately hydrolyze the hydrolyzable compound. The electrode fixture assembly is then placed in a controlled atmosphere and subjected to time and temperature treatment sufficient to produce a standoff gel coating on the surface of the bipolar electrode. The electrode fixture assembly is then subjected to sufficient time and temperature in a controlled atmosphere to convert the standoff gel coating to a dry, porous, adherent, and dielectric coating.

In another embodiment of the invention a method for making an electrochemical capacitor is presented. At least two bipolar electrodes are stacked together with each electrode separated by a predetermined amount of a solid ionic conductor to form a stacked assembly. The melting point of the solid ionic conductor is above about 30° C. Each of the bipolar electrodes comprises an electrode substrate consisting of a metal foil with a porous electronically conductive oxide coating on each surface and at least one of the electronically conductive oxide coatings being covered by a porous standoff layer. The standoff layer comprises a porous dielectric oxide. Both the electronically conductive oxide coating and the dielectric coating are capable of being wetted by the solid ionic conductor at temperatures above the melting point of the ionic conductor. The temperature of the stacked assembly is increased to above the melting point of the solid ionic conductor thereby melting the ionic conductor to produce a molten ionic conductor. Sufficient time is allowed for the molten ionic conductor to infiltrate the porous coatings of the electrodes. Pressure is applied to the stacked assembly sufficient to produce intimate contact between adjacent surfaces of the bipolar electrodes while expelling excess molten ionic conductor from between the electrode surfaces. The stacked assembly is cooled in a controlled fashion to produce a laminate structure. This laminate structure may then be cut by a diamond saw along the edges and packaged to produce an electrochemical capacitor having the desired capacitance.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION OF THE INVENTION

Figure 1:
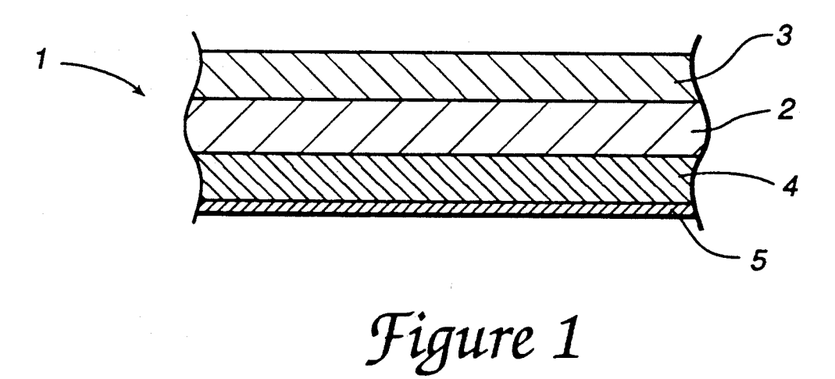
FIG. 1 shows a cross-sectional view of a single bipolar electrode.

Referring now to FIG. 1, a bipolar electrode 1 of the invention is shown. An electrode substrate 2 serves as a support for an anode 3 and a cathode 4. The electrode substrate 2 also serves as an electrical connection between the anode 3 and the cathode 4 by allowing the flow of electrons while blocking ionic conduction between the anode 3 and the cathode 4. A standoff layer 5 overlays the cathode 4 and prevents direct physical contact between the anode and cathode coatings of adjacent electrodes in a stacked electrode assembly. In an electrochemical capacitor of the invention the bipolar electrodes are alternately layered with a solid electrolyte material to form a laminate structure as described below. Each electrode will form part of two adjacent cells of an electrochemical capacitor. In this context, a bipolar electrode is defined as a flat electrode with each of the two opposing surfaces having the capacity for energy storage through the double layer effect and/or oxidation-reduction (redox) reactions. For some applications, the same material may be used for the anode and cathode layers, while in other applications different materials may be used. Further, for the purpose of illustration, the standoff layer 5 has been shown as being applied to the cathode 4. However, the standoff layer 5 can alternatively be applied to the anode 3. It is also possible to apply a thinner standoff layer to each of the anode 3 and cathode 4 as long as sufficient electrical separation is provided between adjacent layers in a stacked electrode assembly.

While it is desirable that the substrate 2 be as thin as possible, a limiting factor is the occurrence of pinholes in the substrate. It is also desirable that the substrate 2 be made of a material that has limited ductility after the bipolar electrodes have been assembled into a laminate structure, which structure is described below in detail in connection with FIGS. 5 and 6. This lack of ductility is required to prevent burring or local distortion of the substrate during subsequent cutting of the laminate structure into individual capacitors. The limited ductility of the substrate 2 can be achieved by various means. A foil can be used in the cold rolled condition or can be made of a heat treatable alloy such as a martensitic stainless steel. Alternatively, the foil can be made of a metal such as tantalum, which embrittles through heating in the presence of oxygen. Carburizing and nitriding are other methods for decreasing the foil ductility. Since extremely thin foils are desired, it is advantageous to work with a ductile material during preparation of the foil to avoid tearing or cracking in the foil, and then reduce the foil ductility after the desired thickness has been achieved.

The preferred material for the substrate 2 is a metal foil that is chemically inert with respect to the electrolyte and is capable of forming a bond with the anode 3 and cathode 4. It is also desirable that the foil be capable of being etched to provide a rough surface in order to enhance bonding of the anode 3 and cathode 4 to the substrate 2 and also to reduce the interfacial resistance between the anode 3 and substrate 2, and cathode 4 and substrate 2. Among the preferred materials for the electrode substrate are titanium, zirconium, stainless steel, molybdenum and tantalum.

With capacitors produced in accordance with the method of the invention, the anode 3 and the cathode 4 comprise only a fraction of the device volume. Minimizing the thickness of the substrate 2 increases the energy density of the device and also reduces, to a small extent, the equivalent series resistance of the device. Thus, it is desirable to use metals that can be rolled to a thickness of less than about 60 microns.

The anode 3 and cathode 4 are porous coatings consisting of an electronically conducting oxide (as opposed to an ionic conductor). Preferred materials for the coatings are ruthenium oxide, tin oxide, indium oxide and iridium oxide, and oxide mixtures containing at least one of these oxides.

Figure 2:
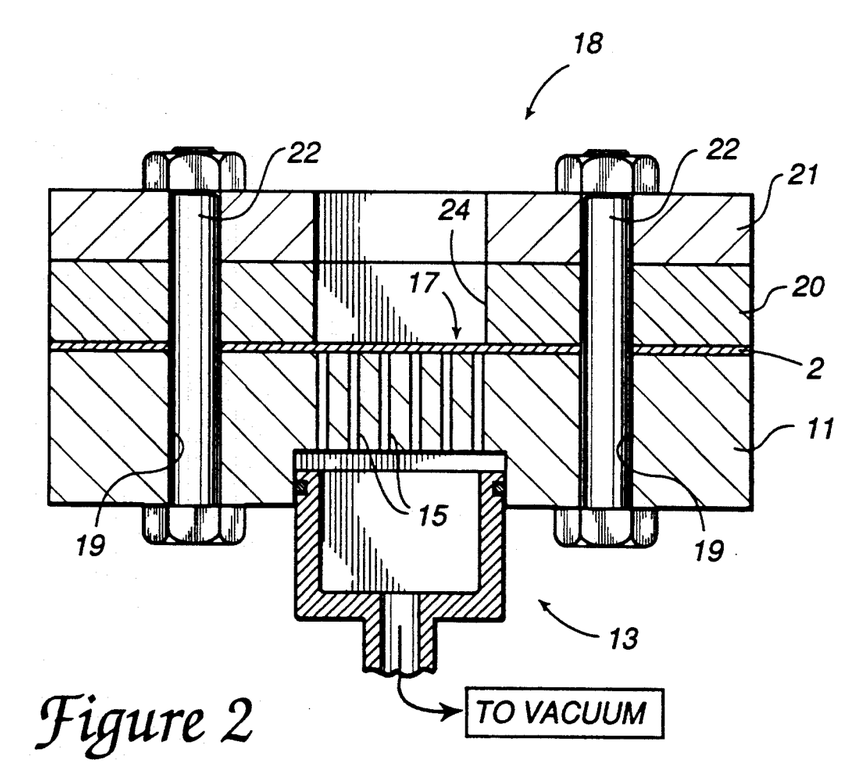
FIG. 2 shows a cross-sectional view, taken along line 2—2 from FIG. 3, of a foil substrate fixtured in a vacuum chuck arranged for application of a first electrode coating in accordance with the process of the invention.
Figure 3:
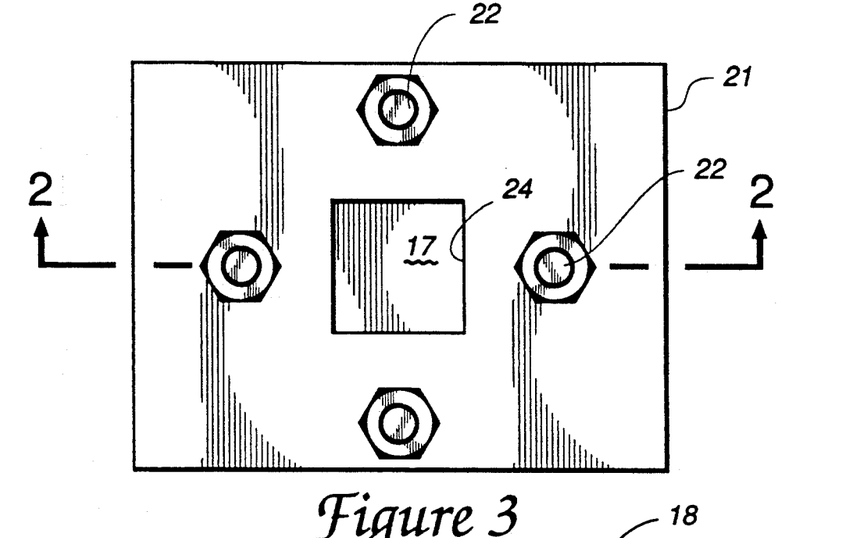
FIG. 3 shows a plan view of a fixtured foil substrate illustrating a reservoir and clamp bolts.

An electrode fixture assembly 18 for producing bipolar electrodes according to the method of the invention by application of the anode 3 and cathode 4 to the substrate 2 is shown in FIGS. 2 and 3. A sol-gel process is the preferred technique for obtaining the porous oxide coating. The sol-gel process is well known as a technique for producing oxide coatings and powders from solutions of metal salts, alkoxides and organometallic compounds. See Sol-Gel Technology for Thin Films, Preforms, Electronics, and Specialty Shapes: 1988, Edited by Lisa C. Klein; Noyes Publications, Park Ridge, N.J. The process has been used to produce porous conductive films consisting of ruthenium and titanium oxides. See, for example, French Patent Application No. 85-13628. In addition, the sol-gel process has been used for other oxide materials used as electrodes in electrochemical energy storage devices. See R. Messina, et. al., Solid State Ionics, v28-30, pp. 886-94, 1988; and R. Messina, et. al., Electrochemica Acta, v36, n10, pp. 1595-1603, 1991. For the sol-gel process as applied in the current invention, alkoxides are the preferred precursors. The desired amounts of the metal alkoxides are mixed in an organic solvent such as butanol at room temperature until a homogeneous solution is obtained. Additional organic solvent containing sufficient water to completely hydrolyze the alkoxide species is added to the solution followed by further mixing.

Although metals such as molybdenum can be rolled to thicknesses as low as 0.3 mils, they are seldom flat. Further, the flatness of the exposed substrate surface while fixtured will be a function of the substrate thickness and the exposed area. Thus, in order to produce uniform sol-gel coatings on very thin electrodes or large area electrodes, the substrate 2 must be attached during the coating process to a flat plate 11 to provide adequate support over the entire substrate. Referring again to FIG. 2, the preferred method for attaching the substrate 2 to the flat plate 11 is the use of an integral vacuum chuck 13. The integral vacuum chuck 13 consists of the flat plate 11 containing an array of holes 15 that are connected to a vacuum port. The diameter and distribution of the holes 15 is determined by the mechanical properties of the foil used for the substrate 2. The total surface area of the array of holes 15 must provide for sufficient force through differential pressure to hold the foil substrate 2 against the flat plate 11 when a vacuum is applied to the vacuum port. The diameter of the holes 15 must be small enough so that the local deformation of the unsupported foil area over each hole 15 is minimized. Vacuum chucks are well known in the electronics industry and are typically used in connection with rigid materials such as semiconductor wafers and ceramic substrates. It is only necessary to provide holes 15 under the exposed regions of the substrate 2.

The substrate 2 to be coated with the anode 3 and cathode 4 is punched with a plurality of alignment holes 19 corresponding to holes in the flat plate 11. These holes 19 surround an exposed region 17 of the substrate surface and also serve for alignment in the electrode fixture assembly 18 and in the infiltration fixture 30, as discussed below in connection with FIG. 5. A reservoir plate 20 and the flat plate 11 sandwich the substrate 2 and are held together by clamp bolts 22 and a clamp plate 21 to form an assembled fixture 18. The clamp bolts 22 help to maintain intimate contact between the reservoir plate 20 and flat plate 11 and the substrate 2. The force of the clamp bolts 22 is distributed over the surface of the reservoir plate 20 by the clamp plate 21. A cutout 24 in the reservoir plate 20 provides a pocket with the exposed region 17 of the substrate 2 being at the bottom of the pocket. A fluorocarbon or other non-wetting polymer is the preferred material for the reservoir plate 20. Since it is also desirable that the reservoir plate have a degree of thermal stability at temperatures above 100° C., the reservoir plate can alternatively be fabricated from a metal that is coated with a suitable polymer. The use of a coated metal reservoir plate can also allow for the elimination of the clamp plate from the electrode fixture assembly 18. The preferred material for the clamp plate 21 is stainless steel.

After assembly, the electrode fixture assembly 18 is placed in a horizontal position and a measured amount of the coating solution described above is introduced into the fixture pocket. The assembly 18 is then subjected to a time and temperature profile in a controlled atmosphere that is sufficient to hydrolyze the alkoxide and produce a gel coating from the applied solution. Such a profile may for example be at temperatures from about 40° C. to about 150° C. and may take from about one hour to about 48 hours. These numbers are given as examples and are in no way intended to indicate critical limits. This novel fixture coating method is preferable to conventional spin coating and dipping methods because it is capable of producing relatively thick, high porosity coatings from solutions with low viscosities and because it is capable of providing accurate coverage of a given area in terms of coating mass per unit area. The cutout 24 in the reservoir plate 20 defines the active electrode region 17 on the substrate and confines the applied coating solution to that area. Uniformity among electrodes is particularly important when large numbers (i.e., greater than 100) are to be stacked in a single device. If the capacitance of each of the electrodes in a cell stack is not uniform, the device voltage will not be evenly divided among the individual cells. As a device is charged, the cell that has the lowest capacitance will reach the electrolyte decomposition voltage before the others, thus limiting the energy stored in the device. Ideally, each cell should have the same capacitance.

After the gel coating has been applied to the substrate 2 to form the anode 3 (or cathode 4 since the order is not critical) the new electrode is removed from the fixture 18 and subjected to a time and temperature profile in a controlled atmosphere, to dry and sinter the gel. The sintering step is desired to produce a porous coating that has sufficient strength and adhesion while maintaining a specific surface area of between 15 and 300 square meters per gram. A small amount of silicon alkoxide may be added to the applied coating solution to promote sintering at lower temperatures. Depending upon the sintering conditions, removal of the substrate 2 from the fixture 18 may not be required.

The electrode coating and standoff layer 5 (if present) must be completed on one side of the substrate 2 before the opposite side is processed. After a gel coating has been applied to one side of the substrate 2, the substrate 2 is inverted and the process is repeated on the other side of the substrate. The coating solution used on the cathode side is not necessarily the same as that used on the anode side since the redox reactions at the cathode 4 may differ from those at the anode 3. For some applications the anode 3 and cathode 4 are identical resulting in what is essentially a non-polar device. In other applications, the anode 3 and cathode 4 are indeed different and the device is polar. The fixturing method of the invention allows for different coatings to be produced on each side of the substrate 2 with considerable ease as compared to dip coating.

Although the vacuum chuck performance is most efficient when used against the uncoated substrate, a flat surface for the second coating can be obtained if the vacuum pump capacity is sufficient to handle the gas leakage through the first porous coating. Gas leakage through the porous coating can be reduced by providing enough force to the reservoir plate 20 to crush the porous coating at the perimeter of the electrode coating sites. In addition, the cutout 24 in the reservoir plate 20 used for the second electrode coating can be reduced in area so that the reservoir plate 20 will bear on the perimeter of the coating sites on the first side of the substrate 2. The vacuum chuck 13 is particularly well suited for use with foils with a thickness of less than 5 mils. It is also well suited for use with thicker foils that are used for large area electrodes (i.e., greater than one inch square).

After sintering of the anode and cathode coatings, the substrate 2 is again fixtured for application of the standoff layer 5. The standoff layer fixturing is essentially the same as that used for the application of the anode and cathode coatings, except that the reservoir cutout 24 is 0.25 to 0.5 mm larger to prevent the reservoir plate 20 from overlapping the anode and cathode coatings that are on the substrate 2.

The standoff layer 5 is a porous dielectric oxide layer produced by the sol-gel process using alkoxides of elements such as aluminum, silicon, titanium and zirconium in solution with an organic solvent. The solutions for the application of the standoff gel coating are prepared in a similar fashion to the solutions for the anode and cathode coatings.

After fixturing, a measured amount of a solution of the organic solvent used in the standoff layer 5 and water is introduced into the anode (or cathode) reservoir to saturate the porous anode (cathode) coating, followed by a measured amount of the standoff alkoxide solution. The depth of the solution in the reservoir should generally not exceed the thickness of the desired final standoff layer coating by more than about 50 times. The presaturation of the porous electrode coating with the organic solvent is desired to prevent the solution containing the alkoxides from penetrating the pores of the coating through capillary action. The solution used for the standoff layer is prepared in a manner that gives a particle size that is larger than the pore diameter of the porous electrode coating. This particle size is desired to minimize occlusion of the porous electrode by the particles in the solution. The assembly 18 is then subjected to a time and temperature profile that is sufficient to produce a gel from the solution. The electrode assembly is then subjected to a time and temperature treatment sufficient to convert the standoff gel coating to a porous dielectric coating. Depending upon the heating conditions, the electrode assembly may or may not be removed from the fixture 18.

Alternatively, if the standoff layer 5 is applied to the second electrode coating, it can be applied to the anode 3 or cathode 4 prior to drying of the gel used to produce the electrodes. This approach reduces the overall number of process steps, but requires compatibility between the electrode coating gels and standoff gel with respect to solvents, drying schedules and sintering schedules. If the standoff layer(s) and electrode layer(s) use solvents with a high heat of mixing, the application of the standoff layer coating solution can disrupt the established electrode coating gel. Also, since amorphous materials such as silica sinter and densify much more quickly than crystalline materials, co-firing of the standoff layer and electrode coatings is limited in terms of the allowable materials combinations.

As stated above, the function of the standoff layer 5 is to prevent direct physical contact between the anode 3 and cathode 4 of adjacent electrode assemblies. It is also desirable that the standoff coating have a high percent porosity so that it can be infiltrated with a molten electrolyte. Since the electrolyte electrical conductivity is about two orders of magnitude less than that of the conductive oxide electrode coatings, it is desirable to keep the standoff layer 5 as thin as possible and to maintain a high porosity in the coating. Although the application of very thin porous coatings is not difficult, it must be realized that as a practical matter, the electrode assemblies are neither ideally smooth nor ideally flat. The sol-gel method is inherently well suited to producing smooth flat coatings; however, if dust particles become entrained in the solutions prior to gelation, the smooth surface will be degraded. For this reason, it is very desirable that the coating process be done in a clean environment and that coating solutions be prepared from filtered materials. The thickness of the standoff coating must be greater than the height of any protrusions in the cathode 4 and anode 3 surfaces if shorting is to be prevented. Contact shorts through the standoff coating will increase the leakage current in the cell. Smooth anode and cathode surfaces will allow for a thin standoff layer 5 which will in turn give a lower equivalent series resistance. It is thus desirable to produce electrode coatings of about 10 microns in thickness and standoff layers of about 10 microns or less in thickness.

As an alternative to the vacuum chuck 18, an electromagnetic chuck could be used with magnetic substrates. Adhesives can also used for attaching the substrate, but contamination of the porous coatings is a potential problem.

After sintering of the standoff layer(s) 5 the electrode blank is ready for assembly. Although only one electrode blank is shown in FIGS. 2 and 3, it will be understood that the coating fixture can be made with a multiplicity of cutouts 24 in the reservoir plate 20, thereby allowing numerous electrodes to be fabricated on a single substrate 2. When a single sheet substrate is processed to contain a multiplicity of electrode blanks, the electrode blanks can be separated by cutting up the sheet.

Figure 4:
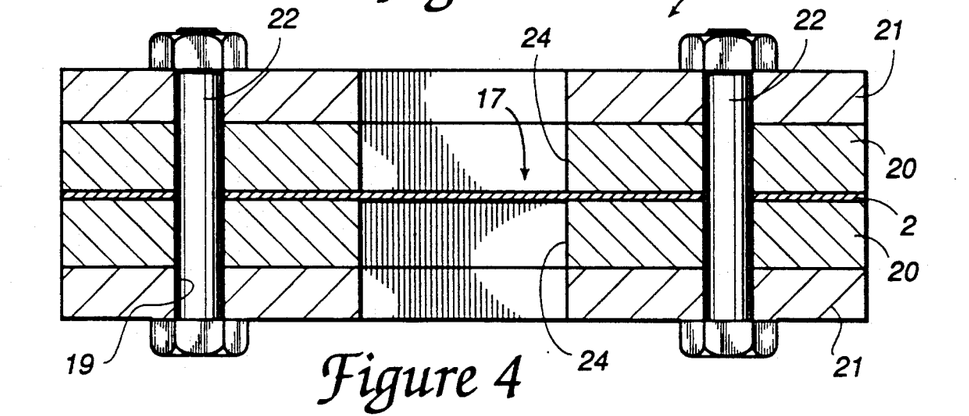
FIG. 4 is a cross-sectional view of an alternate embodiment of the fixture for application of electrode coatings; solid electrolyte capacitor showing one complete cell.

FIG. 4 shows an alternative embodiment of an electrode fixture assembly 18. A pair of reservoir plates 20 are held in intimate contact with either side of the substrate 2 by a pair of clamp plates 21 and clamp bolts 22. The substrate 2 is punched with alignment holes through which the clamp bolts 22 fit and which holes are used later for alignment with the infiltration fixture 30 discussed below in connection with FIG. 5. The hole pattern allows for sufficiently uniform pressure to create a seal around the perimeter of the cutout 24 in each of the reservoir plates 20 while maintaining the flatness of the substrate 2. The cutouts 24 in the reservoir plates 20 produce a pocket on each side of the electrode fixture assembly 18. The fixture could alternatively be made without the clamp plates by using a thicker reservoir plate 20 and increasing the number of clamp bolts 22.

Figure 5:
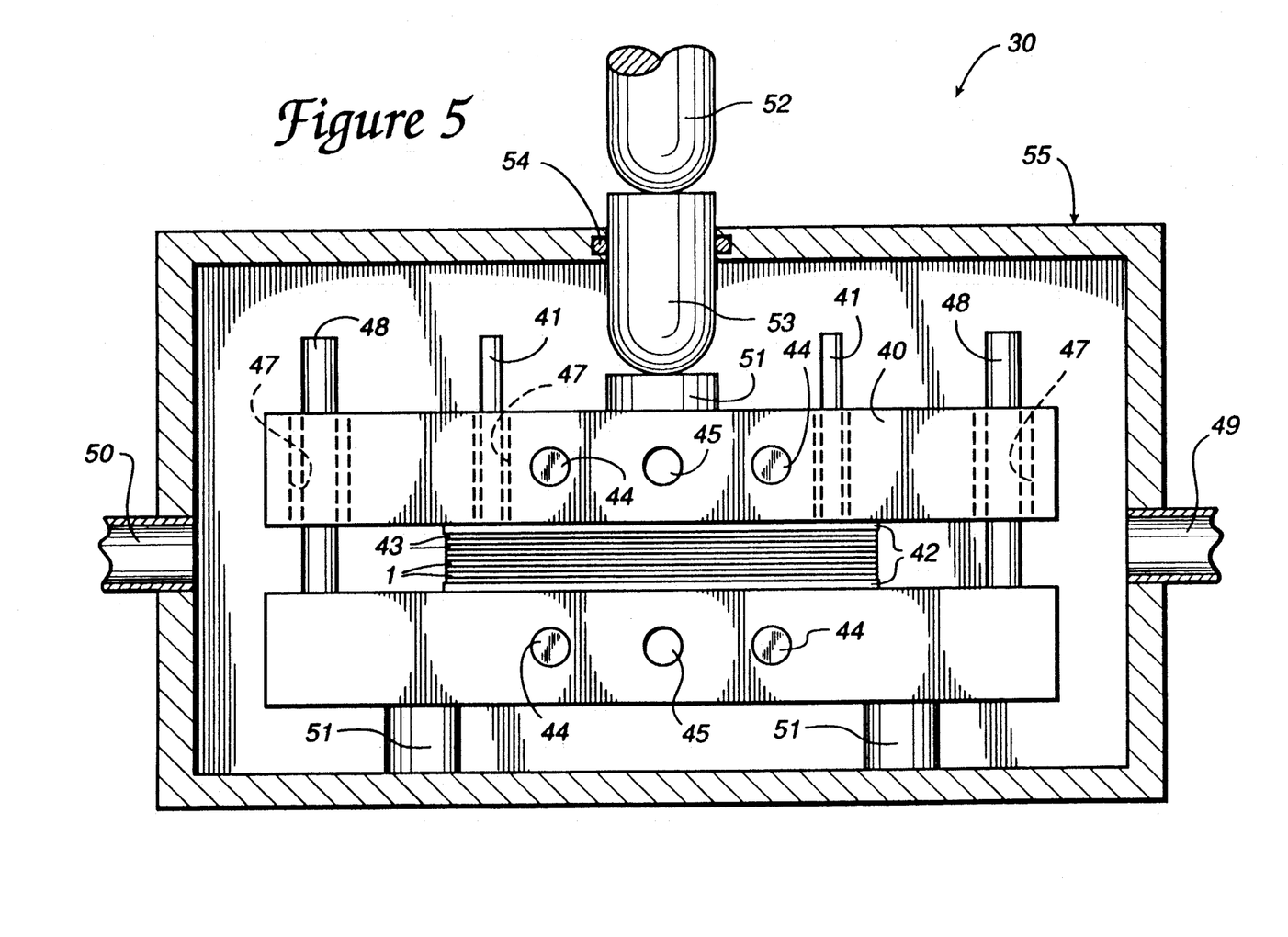
FIG. 5 shows an apparatus used for stacking electrodes and electrolyte to produce an electrode assembly with contacts in accordance with the invention.

Referring to FIG. 5, an infiltration fixture 30 for use in the next processing steps is shown. The holes in the electrode blanks that were punched to allow clearance for the clamping bolts 22 now serve to align the electrode blanks as they are stacked in the infiltration fixture 30. A pressure follower 40 has clearance holes bored to provide clearance for a plurality of electrode alignment pins 41 which protrude from a fixture base 46. The pressure follower 40 and base 46 each include resistance heating elements 44 and cooling channels 45 for use in temperature processing steps. The electrodes are assembled into a stack as shown in FIG. 5. The bipolar electrodes 1 are stacked between a pair of contact plates 42 with a measured amount of solid electrolyte 43 placed between each successive bipolar electrode 1 and between the top and bottom bipolar electrodes 1 and the contact plates 42. The contact plates 42, which may be of the same material as the substrate 2, are part of the final capacitor, are thicker than the electrode substrates 2 and have the same hole pattern as the bipolar electrodes 1. The contact plates 42 serve to increase the rigidity of the final capacitor and provide for electrical contact to the capacitor. The contact plates 42 have been processed to have an electrode coating on one side only, with the other side which faces outward having a finish suitable for soldering, spot welding or otherwise attaching an electrical lead to the device. The coating on each of the contact plates 42 is required to provide a complete cell in combination with the top and bottom bipolar electrodes in the stack.

The infiltration fixture 30 is then subjected to a time-/temperature profile under a controlled atmosphere to produce melting of the solid electrolyte layers 43. The heating of the stack is provided by the resistance heating elements 44 embedded in the pressure follower 40 and base 46. The pressure follower 40 provides the force necessary to maintain the flatness of the bipolar electrodes and also serves to force the excess molten electrolyte from the stack during the heating step. The force acting on the stack due to the weight of the pressure follower 40 can be augmented by a pneumatic ram 52 if necessary and would not be expected to exceed about 10 pounds per square inch. The force from the pneumatic ram 52 is transmitted to the pressure follower 40 through a wall of a chamber 55 by a sliding piston 53 that is sealed by an 'o'-ring 54. It is desirable that the surfaces of the pressure follower 40 and base 46 be as close to parallel as possible to produce uniform cell gaps within the stack. Parallelism is achieved through the use of high temperature bushings 47 and alignment shafts 48 that serve to align the pressure follower 40 and base 46.

The controlled atmosphere in which the infiltration occurs will be dependent upon the electrolyte used. For electrolytes such as $RbAg_4I_5$ or $Rb_4Cu_{16}I_7Cl_{13}$, or other halide solids, it is desirable to reduce the amount of moisture and oxygen present while the electrolyte is in the molten state since they are susceptible to oxidation. This can be achieved by heating the assembly at a temperature of at least about 100° C. under a vacuum of less than about $10^{-2}$ torr for a period of at least about 15 minutes by connection to a vacuum source by means of a vacuum port 49. The time, temperature and vacuum required will be a function of the electrode material and its history. Due to the high available surface area of the bipolar electrodes 1, it is desirable that devices with moisture sensitive electrolytes be stored in a controlled environment. Although adsorbed moisture can be desorbed, it is desirable to minimize the quantity that must be desorbed from a stacked assembly since the path available to desorbing species is restricted. Vacuum outgassing of the separated electrodes followed by dry storage of the electrodes is more efficient than removing moisture from the stack.

Where the solid electrolyte 43 is a heteropolyacid such as molybdophosphoric acid or tungstophosphoric acid it is important to maintain the proper partial pressure of water during the infiltration process in order to maintain the hydration state associated with the maximum protonic conductivity. Although evacuation of the assembly that is to be infiltrated with a heteropolyacid is required to remove the gas from electrode assemblies, a source of water vapor such as a vapor port 50 must be provided to maintain hydration. Under these conditions the vacuum system must be capable of handling a large amount of water vapor.

The incongruent melting behavior of many of the halide solid electrolytes requires that the molten electrolyte be rapidly cooled or quenched to avoid phase segregation. After infiltration, the rapidly solidified electrolyte is aged to produce the equilibrium structure. Since the cooling of an incongruently melting material involves the reaction of a liquid and solid to produce another distinct solid, it is desired that the liquid and solid be finely mixed at the time of freezing. If the molten electrolyte is allowed to cool slowly and segregate into the equilibrium liquid and solid, it will be more difficult to achieve an equilibrium structure in the fully solidified material. Quenching followed by thermal aging is the preferred method for achieving the equilibrium structure. In the case of $Rb_4Cu_{16}I_7Cl_{13}$, complete melting is achieved at above 300° C. and solidification occurs in the neighborhood of 234° C. It is thus desirable that the assembly be cooled very quickly through the range of about 300° C. to 234° C. Rapid cooling can be achieved by providing the flow of a coolant through cooling channels 45 in the pressure follower 40 and fixture base 46.

The solidification behavior of the heteropolyacids does not require rapid cooling; however, a heteropolyacid infiltrated stack should be cooled at a reasonable rate to avoid changes in the state of hydration. Since the partial pressure of water vapor provided in the chamber is that required to maintain hydration of the solid phase, the liquid phase may undergo a change of hydration over time at the exposed edges of the stack. Although the hydration state of the heteropolyacid can be restored, it is preferable to avoid the need to do so. The vapor pressure of water is provided for by connection to a vapor source by means of the vapor port 50.

The solidification of the electrolyte produces a laminate structure in which the individual bipolar electrodes 1 are bonded together by the electrolyte that has infiltrated the porous surfaces of the electrodes. The change in specific volume that occurs during freezing may result in undesirable porosity and/or stresses in the laminate structure if the heat transfer from the stack is not controlled. By cooling the stack from the center through conduction to the pressure follower 40 and the base 46, molten electrolyte from the perimeter of the stack can flow towards the center to accommodate the volume changes. If the stack is cooled from the perimeter inward, stresses and voids will result since there is no available source of liquid electrolyte within the frozen outer shell. Central cooling can be established by proper location of the cooling channels 45 in the pressure follower 40 and/or base 46 and controlling both the flow of coolant and heating current in the heating elements 44 to produce the required temperature gradients. Care must be taken in the materials selection and mechanical design of the base 46 and pressure follower 40 to minimize warping due to the temperature gradients established for the controlled solidification. Surface warping can be controlled by maintaining the symmetry of the temperature profile about the axis of the cooling channels 45 in both the pressure follower 40 and base 46. The thermal symmetry can be improved by ensuring that the heat content removed from the stacked assembly is relatively small when compared with the heat capacity of the pressure follower 40 and base 46. Transient thermally induced elastic deformation of the pressure follower 40 and base 46 may result in larger than necessary electrolyte gaps with a concomitant increase in equivalent series resistance of the devices and should be avoided. Heat loss to the chamber 55 is reduced by the use of thermally insulating standoffs 51.

Figure 6:
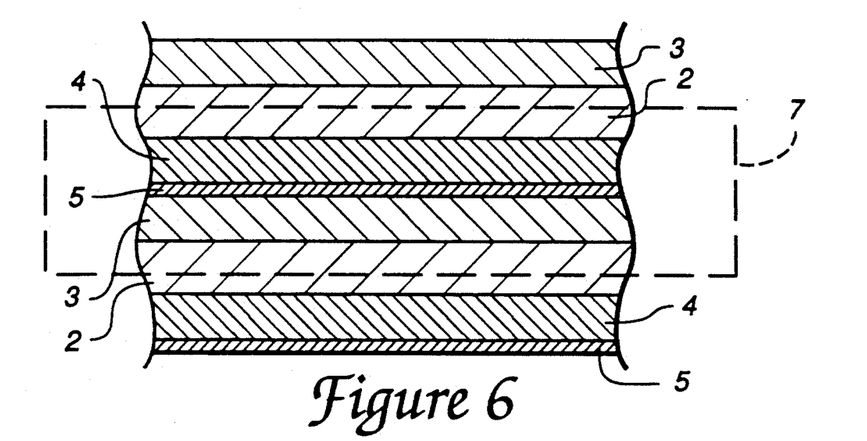
FIG. 6 shows a cross-sectional view of a portion of a solid electrolyte capacitor showing one complete cell.

A complete capacitor cell 7 is illustrated in cross-section in FIG. 6. The anode 3 from one bipolar electrode 1 is separated by a standoff layer 5 from the cathode 4 of the adjacent bipolar electrode 1. A portion of the electrically conductive substrate 2 backing each electrode 3, 4 completes the cell. Although not shown in this figure, the standoff layer 5 and electrodes 3 and 4 are infiltrated by the solidified electrolyte.

After solidification of the electrolyte has converted the stacked assembly to a monolithic laminate structure, the laminate structure is then cut into individual capacitors. The preferred method for cutting the laminate structure is a low speed diamond saw lubricated with a coolant that is inert with respect to the electrolyte. It is preferred that the cutting process produce a surface finish on each capacitor that is free from burrs and distortion of the electrode substrate 2. Since the spacing between substrates may be only a few microns, it is critical that burrs and edge deformation be minimized in order to minimize additional polishing steps prior to packaging.

The cutting operation allows for the removal of the exterior portions of the laminate that may have been degraded due to atmospheric reaction or solidification defects or which may have been crushed in fixturing with the vacuum chuck. The sawed edge will typically have a better finish than the starting substrate since it is fully supported by solid material on both sides during the cutting operation. The sawn surface may be grit blasted or otherwise abraded to preferentially remove electrolyte from the space between electrodes prior to encapsulation. The recessed electrolyte gap serves to increase the potential short circuit path between the anode and cathode. The recess also provides a mechanical interlock for encapsulants such as epoxy. Conventional packaging techniques are used to complete the electrochemical capacitor.

The laminate structure allows considerable freedom in determining the final capacitance value of a device. Since the capacitance of a device cut from the laminate structure will be a function of area, close tolerances can be achieved for devices by cutting an initial test device from the laminate structure and measuring its electrical properties. The required area for subsequent devices can thus be accurately determined and the devices cut accordingly.

Another important advantage of the laminate structure over that of the conventional pressed powder electrodes is the strength provided by the composite structure. The relatively brittle oxide and electrolyte materials are effectively reinforced by the metal foil substrates. This allows for easier handling of larger and thinner structures.

It should be understood that various alternatives to the embodiments of the invention described herein may be employed in practicing the invention. It is intended that the following claims define the scope of the invention and that structures and methods within the scope of these claims and their equivalents be covered thereby.

I claim:

1. A method for making an electrochemical capacitor comprising the steps of:
   (a) assembling a stacked assembly of at least two bipolar electrodes, wherein adjacent electrodes are separated by a predetermined amount of a solid ionic conductor having a melting point above about 30° C., each of said bipolar electrodes comprising a metal foil electrode substrate having a porous electronically conductive oxide coating on each surface, with at least one of said electronically conductive oxide coatings being covered by a standoff layer comprising a porous dielectric oxide, and said electronically conductive oxide coating and said dielectric coating both being capable of being wetted by said solid ionic conductor at temperatures above the melting point of said ionic conductor;
   (b) heating said stacked assembly to a temperature above the melting point of said solid ionic conductor thereby melting said ionic conductor to produce a molten ionic conductor;
   (c) allowing sufficient time for said molten ionic conductor to infiltrate the porous coatings of said electrodes;
   (d) applying sufficient pressure to said stacked assembly to produce intimate contact between adjacent surfaces of said bipolar electrodes while expelling excess liquid from between the electrode surfaces; and
   (e) cooling said stacked assembly in a controlled fashion to produce a laminate structure.

2. The method of claim 1 and further including the step during said assembling step of positioning first and second contact plates, each having a porous electronically conductive oxide coating on one surface, on the top and bottom respectively of said stacked assembly with a layer of said solid ionic conductor between the coated surface of each contact plate and said stacked assembly.

3. The method of claim 2 and further including the step of sawing to a predetermined size and shape said laminate structure along cutting lines perpendicular to the planes of said electrode substrates.

4. The method of claim 1 and further including the steps, following said assembling step, of heating said stacked assembly at a temperature below the melting point of said solid electrolyte in a controlled atmosphere to remove undesirable gases; and
   allowing sufficient time for desorption of undesirable adsorbed species in the assembly.

5. An electrochemical capacitor produced by the method of claim 1.

6. The electrochemical capacitor of claim 5 wherein said electrolyte is a heteropolyacid.

7. The electrochemical capacitor of claim 5 wherein said electrolyte is $Rb_4Cu_{16}I_7Cl_{13}$.

8. The electrochemical capacitor of claim 7 wherein said standoff layer comprises aluminum oxide.

9. A method for making an electrode suitable for use in an electrochemical energy storage device comprising the steps of:
   (a) positioning a flat reservoir plate having at least one cutout on a flat metal foil to allow exposure of a first defined area on a first side of said flat metal foil;
   (b) establishing intimate contact between said metal foil and said reservoir plate, thereby forming an electrode fixture assembly with a first pocket on said first side of said metal foil, said first pocket being capable of confining a liquid to the exposed area of said metal foil;
   (c) orienting said electrode fixture assembly in a horizontal position and introducing into said first pocket a coating solution containing at least one hydrolyzable compound of a metal capable of forming an electronically conductive oxide, and sufficient water to ultimately hydrolyze said hydrolyzable compound;
   (d) subjecting said electrode fixture assembly to a controlled atmosphere for a time and at a temperature sufficient to convert said coating solution to a gel coating on the surface of said first side of said metal foil;
   (e) subjecting said electrode fixture assembly to further temperature treatment in a controlled atmosphere for a sufficient time to produce a first electrode by converting said gel coating to a dry, porous, adherent and electronically conductive coating;
   (f) positioning said reservoir plate on the second side of said flat metal foil to allow exposure of a second defined area on said second side of said metal foil, said second defined area being in substantial alignment with said first defined area;
   (g) establishing intimate contact between said metal foil and said reservoir plate, thereby forming an electrode fixture assembly with a second pocket on said second side of said metal foil, said second pocket being capable of confining a liquid to the exposed area of said metal foil;
   (h) orienting said electrode fixture assembly in a horizontal position and introducing into said second pocket a coating solution containing at least one hydrolyzable compound of a metal capable of forming an electronically conductive oxide, and sufficient water to ultimately hydrolyze said hydrolyzable compound;
   (i) subjecting said electrode fixture assembly to a controlled atmosphere for a time and at a temperature sufficient to convert said coating solution to a gel coating on the surface of said second side of said metal foil; and (j) subjecting said electrode fixture assembly to further temperature treatment in a controlled atmosphere for a sufficient time to produce a second electrode by converting said gel coating to a dry, porous, adherent and electronically conductive coating.

10. The method of claim 9 wherein said positioning steps each includes the step of clamping said metal foil between said reservoir plate and a vacuum chuck.

11. The method of claim 9 wherein said positioning steps each includes the step of clamping said metal foil between said reservoir plate and an electromagnetic chuck.

12. The method of claim 9 with the additional steps of:

(a) orienting said electrode fixture assembly in a horizontal position and introducing a coating solution containing a hydrolyzable compound capable of forming a dielectric oxide, and sufficient water to ultimately hydrolyze said hydrolyzable compound into the upper pocket of said electrode fixture assembly on top of at least one of said conductive coatings;

(b) placing said electrode fixture assembly in a controlled atmosphere and subjecting it to sufficient time and temperature to produce a standoff gel coating on the surface of said at least one conductive coating; and (c) subjecting said electrode fixture assembly to sufficient time and temperature in a controlled atmosphere to convert said standoff gel coating to a dry, porous, adherent, and dielectric coating.

13. A method for making a bipolar electrode suitable for use in an electrochemical energy storage device comprising the steps of:

(a) positioning a flat metal foil having first and second surfaces between first and second flat reservoir plates, respectively, each having at least one cutout to allow exposure of a defined area on each side of said flat metal foil;

(b) clamping said reservoir plates to establish intimate contact between said metal foil and said reservoir plates, thereby forming a first electrode fixture assembly with first and second pockets on opposing sides of said metal foil, wherein said pockets are aligned with each other and each pocket is capable of confining to the exposed area of said metal foil a liquid deposited on the surface of said metal foil;

(c) orienting said electrode fixture assembly in a horizontal position with said first foil surface, said first reservoir plate and said first pocket on an upper side of said fixture assembly;

(d) introducing into said first pocket of said electrode fixture assembly a coating solution containing at least one hydrolyzable compound of a metal capable of forming an electronically conductive oxide and sufficient water to ultimately hydrolyze said hydrolyzable compound;

(e) placing said electrode fixture assembly in a controlled atmosphere for a time and at a temperature sufficient to produce a gel coating on said first surface of said metal foil;

(f) removing said electrode fixture assembly from said controlled atmosphere;

(g) inverting said electrode fixture assembly and introducing into said second pocket of said electrode fixture assembly a coating solution containing at least one hydrolyzable compound of a metal capable of forming an electronically conductive oxide, and sufficient water to ultimately hydrolyze said hydrolyzable compound;

(h) placing said electrode fixture assembly in a controlled atmosphere for a time and at a temperature sufficient to produce a gel coating on said second surface of said metal foil; and (i) subjecting said electrode fixture assembly to a controlled atmosphere for a time and at a temperature sufficient to produce a bipolar electrode by converting said gel coatings to first and second dry, porous, adherent and electronically conductive coatings.

14. The method of claim 13 wherein said metal foil is removed from said electrode fixture assembly prior to being subjected to sufficient time and temperature in a controlled atmosphere to produce a bipolar electrode by converting the gel coatings to dry, porous, adherent, and electronically conductive coatings.

15. The method of claim 13 with the additional steps of:

(a) orienting said electrode fixture assembly in a horizontal position and introducing a coating solution containing a hydrolyzable compound capable of forming a dielectric oxide, and sufficient water to ultimately hydrolyze said hydrolyzable compound into the upper pocket of said electrode fixture assembly on top of at least one of said conductive coatings;

(b) placing said electrode fixture assembly in a controlled atmosphere and subjecting it to sufficient time and temperature to produce a standoff gel coating on the surface of said at least one conductive coating; and (c) subjecting said electrode fixture assembly to sufficient time and temperature in a controlled atmosphere to convert said standoff gel coating to a dry, porous, adherent, and dielectric coating.

16. The method of claim 14 with the additional steps of:

(a) arranging said bipolar electrode between third and fourth flat reservoir plates, each having cutouts to allow exposure of an area slightly larger than that of said electronically conductive coating;

(b) establishing intimate contact between said metal foil and said third and fourth reservoir plates by a clamping means acting upon the surface of said reservoir plates, thereby forming a second electrode fixture assembly with a pocket on each side of said metal foil wherein each of said pockets is capable of confining a liquid deposited on the surface of said bipolar electrode to the exposed area of said metal foil and said conductive coating; and (c) orienting said second electrode fixture assembly in a horizontal position and introducing into the upper pocket of said electrode fixture assembly a coating solution containing a hydrolyzable compound capable of forming a dielectric oxide and sufficient water to ultimately hydrolyze said hydrolyzable compound;

(d) placing said electrode fixture assembly in a controlled atmosphere and subjecting it to a time and temperature treatment sufficient to produce a standoff gel coating on at least one surface of said bipolar electrode;

(e) subjecting said electrode fixture assembly to sufficient time and temperature in a controlled atmosphere to convert said standoff gel coating to a dry, porous, adherent, and dielectric coating.

17. The method of claim 13 wherein the coating solution applied in step (d) is distinctly different from the coating solution applied in step (g).

18. The method of claim 13 with the additional steps of:
   (a) orienting said electrode fixture assembly in a horizontal position and introducing a coating solution containing a hydrolyzable compound capable of forming a dielectric oxide, and sufficient water to ultimately hydrolyze said hydrolyzable compound into the upper pocket of said electrode fixture assembly;
   (b) placing said electrode fixture assembly in a controlled atmosphere and subjecting it to sufficient time and temperature to produce a standoff gel coating on the surface of said bipolar electrode;
   (c) subjecting said electrode fixture assembly to sufficient time and temperature in a controlled atmosphere to convert said standoff gel coating to a dry, porous, adherent, and dielectric coating.

19. A bipolar electrode produced by the method of claim 13.

20. A bipolar electrode produced by the method of claim 15.

21. A method for making an electrochemical capacitor comprising the steps of:
   (a) positioning a flat reservoir plate having at least one cutout on a flat metal foil to allow exposure of a first defined area on a first side of said flat metal foil;
   (b) establishing intimate contact between said metal foil and said reservoir plate, thereby forming an electrode fixture assembly with a first pocket on said first side of said metal foil, said first pocket being capable of confining a liquid to the exposed area of said metal foil;
   (c) orienting said electrode fixture assembly in a horizontal position and introducing into said first pocket a coating solution containing at least one hydrolyzable compound of a metal capable of forming an electronically conductive oxide, and sufficient water to ultimately hydrolyze said hydrolyzable compound;
   (d) subjecting said electrode fixture assembly to a controlled atmosphere for a time and at a temperature sufficient to convert said coating solution to a gel coating on the surface of said first side of said metal foil;
   (e) subjecting said electrode fixture assembly to further temperature treatment in a controlled atmosphere for a sufficient time to produce a first electrode by converting said gel coating to a dry, porous, adherent and electronically conductive coating;
   (f) positioning said reservoir plate on the second side of said flat metal foil to allow exposure of a second defined area on said second side of said metal foil, said second defined area being in substantial alignment with said first defined area;
   (g) establishing intimate contact between said metal foil and said reservoir plate, thereby forming an electrode fixture assembly with a second pocket on said second side of said metal foil, said first pocket being capable of confining a liquid to the exposed area of said metal foil;
   (h) orienting said electrode fixture assembly in a horizontal position and introducing into said second pocket a coating solution containing at least one hydrolyzable compound of a metal capable of forming an electronically conductive oxide, and sufficient water to ultimately hydrolyze said hydrolyzable compound;
   (i) subjecting said electrode fixture assembly to a controlled atmosphere for a time and at a temperature sufficient to convert said coating solution to a gel coating on the surface of said second side of said metal foil;
   (j) subjecting said electrode fixture assembly to further temperature treatment in a controlled atmosphere for a sufficient time to produce a second electrode by converting said gel coating to a dry, porous, adherent and electronically conductive coating;
   (k) orienting said electrode fixture assembly in a horizontal position and introducing a coating solution containing a hydrolyzable compound capable of forming a dielectric oxide, and sufficient water to ultimately hydrolyze said hydrolyzable compound into the upper pocket of said electrode fixture assembly;
   (l) placing said electrode fixture assembly in a controlled atmosphere and subjecting it to sufficient time and temperature to produce a standoff gel coating on the surface of said bipolar electrode;
   (m) subjecting said electrode fixture assembly to sufficient time and temperature in a controlled atmosphere to convert said standoff gel coating to a dry, porous, adherent, and dielectric coating.
   (n) assembling a stacked assembly of at least two of said bipolar electrodes, wherein adjacent electrodes are separated by a predetermined amount of a solid ionic conductor having a melting point above about 30° C., and said electronically conductive oxide coating and said dielectric coating both being capable of being wetted by said solid ionic conductor at temperatures above the melting point of said ionic conductor;
   (o) heating said stacked assembly to a temperature above the melting point of said solid ionic conductor thereby melting said ionic conductor to produce a molten ionic conductor;
   (p) allowing sufficient time for said molten ionic conductor to infiltrate the porous coatings of said electrodes;
   (q) applying sufficient pressure to said stacked assembly to produce intimate contact between adjacent surfaces of said bipolar electrodes while expelling excess liquid from between the electrode surfaces; and
   (r) cooling said stacked assembly in a controlled fashion to produce a laminate structure.

22. The method of claim 21 and further including the step during said assembling step of positioning first and second contact plates, each having a porous electronically conductive oxide coating on one surface, on the top and bottom respectively of said stacked assembly with a layer of said solid ionic conductor between the coated surface of each contact plate and said stacked assembly.

23. The method of claim 22 and further including the step of sawing to a predetermined size and shape said laminate structure along cutting lines perpendicular to the planes of said electrode substrates.

* * * * *